United States Patent [19]

Baier et al.

[11] 4,300,720

[45] Nov. 17, 1981

[54] MOTOR VEHICLE

[75] Inventors: Werner Baier, Stockdorf; Reiner Friedl, Starnberg, both of Fed. Rep. of Germany

[73] Assignee: Webasto-Werk W. Baier GmbH & Co., Munich, Fed. Rep. of Germany

[21] Appl. No.: 65,227

[22] Filed: Aug. 9, 1979

[30] Foreign Application Priority Data

Aug. 16, 1978 [DE] Fed. Rep. of Germany ....... 2835829

[51] Int. Cl.³ .............................................. B60H 1/02
[52] U.S. Cl. .......................... 237/12.3 A; 237/12.3 B; 98/2.05; 126/350 A
[58] Field of Search ...................... 237/12.3 B, 12.3 C, 237/2 A; 98/2, 2.05; 126/19.5, 350 A, 110 R; 165/41, 42

[56] References Cited

U.S. PATENT DOCUMENTS

| | | | |
|---|---|---|---|
| 1,991,990 | 2/1935 | Van Vulpen et al. | 237/12.3 B X |
| 3,758,031 | 9/1973 | Moran | 237/12.3 C |
| 3,918,637 | 11/1975 | Kofink | 237/12.3 C |
| 4,018,380 | 4/1977 | Baier | 237/12.3 C |

FOREIGN PATENT DOCUMENTS

| | | |
|---|---|---|
| 2032018 | 1/1972 | Fed. Rep. of Germany . |
| 2709277 | 9/1977 | Fed. Rep. of Germany ... 237/12.3 B |

Primary Examiner—Albert J. Makay
Assistant Examiner—Henry Bennett
Attorney, Agent, or Firm—Craig and Antonelli

[57] ABSTRACT

A motor vehicle with a passenger compartment heating system that allows the interior of the compartment to be heated in substantially noiseless fashion, without a disturbing draft and with a reduction of power consumption. The heating system includes a heat exchanger connectable to the engine cooling circuit and a heater that is operable independent of the engine and a separately disposed heating element that is traversable by a liquid heat conductor. The separately disposed heating element is alternately connectable with the engine cooling circuit, the independently operable heater, and both the cooling circuit and independently operable heater.

8 Claims, 1 Drawing Figure

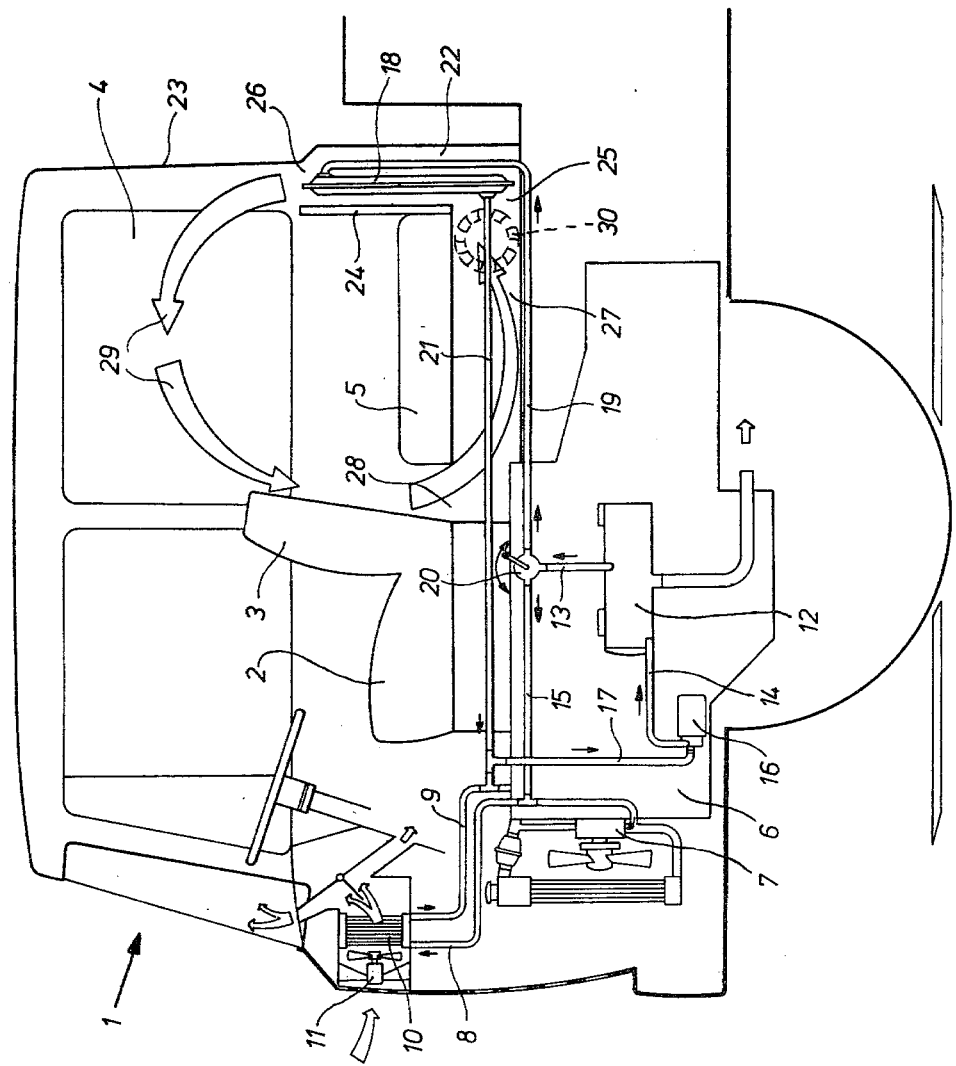

MOTOR VEHICLE

BACKGROUND AND SUMMARY OF THE INVENTION

The invention relates to a motor vehicle with a compartment intended for prolonged occupation by persons, said compartment having a heating system, which can be operated either by connection to the cooling-water circuit of the engine by means of the heat given off by the engine, or by connection to a separate heater independent of engine operation.

In motor vehicles in which persons must remain for a long period of time while the vehicle is parked, for example, trucks with sleeping cabs, road service vehicles, mail trucks and the like, the separate heater must be used to heat the vehicle in winter if the vehicle is occupied by persons. This separate heater is usually connected to the cooling-water circuit of the engine, said circuit in turn containing a heat exchanger, through which hot air, supplied by a blower, is blown into the interior of the motor vehicle. The noise generated by the blower as well as the air flow are extremely disturbing, especially at night. Moreover, the blower drive necessitates a relatively high energy consumption, which limits the operation of the separate heater when the vehicle is parked because of the limited capacity of the motor vehicle battery.

Thus, objects of the invention are to avoid these disadvantages and to allow the interior of a parked motor vehicle to be heated in a largely noiseless fashion, without a disturbing draft, and with a reduction of power consumption.

These goals are achieved according to a preferred embodiment of the invention by virtue of the fact that a heating element traversable by a liquid heat conductor is disposed in the passenger compartment, said heating element being connectable alternatively with the cooling-water circuit, with the separate heater, and with both.

While the vehicle is in operation, the flow of heated heat conductor can be fed through the heating element, so that it is already warm when the motor vehicle is parked. If the temperature in the compartment falls below a certain level, a thermostat turns on the separate heater, which heats up the heat conductor and therefore the heating element as well until the desired temperature is reached in the compartment. Since the separate heater is usually located outside the passenger compartment and a continuously operating hot air blower is not used, in contrast to conventional heating systems, heater operation is largely silent and draft-free.

Preferably, the heating element has a certain heat storage capacity. This results in a power saving since the heating element, as mentioned earlier, can be heated by the vehicle's own heater while the vehicle is operating, so that the heat is provided by the separate heater only after a considerable time has elapsed after the vehicle has been parked.

Preferably, the heating element is disposed in a duct which has a fresh air intake at the bottom and a hot air outlet at the top. To reduce the amount of space the system takes up, the heating element is advantageously made in the form of a plate heater. The duct can be delimited by an outside wall of the passenger compartment and a partition parallel thereto. In a motor vehicle with a driver's cab, including a sleeping compartment with a bunk, the plate heater and the partition are preferably disposed parallel to the rear wall of the cab. Combined with the back rest of the driver's seat, located in front of the bunk, a circular air flow can be created around the bunk, and this locally concentrated heating arrangement results in less power being used for heating.

In order to ensure forced hot air circulation in contact with the heating element, a hot air blower, which can be switched off, can be provided, said blower having a much lower power and lower rpm than the hot air blower used for vehicle heating, and therefore so quiet that it causes no disturbance. Thus, for example, an axial-flow fan can be used, characterized by especially low noise levels.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWING

An embodiment of the invention is described hereinbelow with reference to the drawing, showing a schematic diagram of the driver's cab of a truck in longitudinal cross-section.

DETAILED DESCRIPTION OF THE PREFERRED EMBODIMENT

The cab 1 shown in the drawing is provided with a conventional driver's seat 2 with backrest 3, and behind this, a sleeping compartment 4 with a bunk 5. The water-cooled engine of the vehicle is designated 6. A water pump 7 driven by engine 6 circulates the cooling water through the engine block. The cooling-water circuit of engine 6 is connected to a heat exchanger 10 by a feed line 8 and a return line 9, through which heat exchanger warm air can be blown into the interior of cab 1 by means of a blower 11.

In addition, the vehicle comprises a heater 12 which operates independently of the engine, and is powered by a liquid or gaseous fuel, said heater 12 comprising a water jacket with an outlet stub 13 and a return stub 14. The outlet stub 13 is connected by a line 15 with the inlet stub 8 coming from the cooling circuit of the engine. Return stub 14 is connected by a circulating pump 16 and a line 17 with the return line 9 coming from heat exchanger 10. The separate heater can be used in known fashion to heat the interior of cab 1 with warm air by means of the air/water heat exchanger 10, when the vehicle is parked or when the heat provided by the engine is insufficient. It has now been shown that operation of the separate heater with the vehicle parked is particularly extremely disturbing when people spend the night in the cab, since the noise generated by blower 11 is not insignificant and the relatively high air flow has a disturbing effect upon comfort.

To overcome these disadvantages a plate heater 18 is disposed in cab 1, said heater being connectable by means of a line 19 and a three-way valve 20 with outlet stub 13 and/or via line 15 with feed line 8, said heater further being connected by line 21 with return line 17 and return line 9. Plate heater 18 is disposed in a duct 22, formed by the rear wall 23 of cab 1 and a partition 24. Duct 21 has a fresh air or recycled air inlet 25 at the bottom and a hot air outlet 26 at the top. A duct 27 terminates at inlet 25, said duct running below bunk 5 and communicating with the interior of cab 1 through an opening 28. When plate heater 18 is in operation, the air flow indicated by arrows 29 is generated, said air flow creating a pleasant environment for the occupant of bunk 5 even when the amount of heat provided is low, due to the concentrated local heating.

Plate heater 18 is connected to the heating circuit, as mentioned above, by a three-way valve 20. When valve 20 is in the position indicated, feed line 19 of plate heater 18 is connected with outlet stub 13 of the separate heater and the fluid heated by heater 12 is pumped by pump 16 through plate heater 18. In the middle position feed line 19 is shut off, and only lines 13 and 15 are connected, so that when the separate heater is in operation, the water heated by the latter is fed to heat exchanger 10.

With valve 20 in the left hand end position, feed line 19 is connected with line 15, whereby plate heater 18 is connected with the cooling-water circuit of engine 6, and is traversed by warm water while the vehicle is operating. If the plate heater 18 has a certain heat-storage capacity, after engine 6 is shut off, a warm climate can be produced in cab 1 for a certain space of time before the separate heater must be turned on.

If it is desirable to use forced circulation through plate heater 18, a blower 30, preferably a low-noise axial-flow fan, can be disposed in duct 27. This blower 30 can have a much lower power requirement than hot air blower 11, since the latter must overcome considerable flow resistance in the hot-air ducts.

In contrast to the embodiment shown, heating element 18 can also be disposed elsewhere, for example, in duct 27, whereby the width and therefore the space requirements for the essentially vertical duct 22 can be reduced.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A motor vehicle with a passenger compartment comprising a heating system including a liquid heat conductor containing circuit, a heat exchanger with a hot air blower operable in association therewith for delivering heat to said passenger compartment, said heat exchanger being alternately connected to a portion of said liquid conductor circuit formed by a coolant circuit of an engine of the vehicle and a heater operable independent of said engine located in a first branch of said liquid conductor circuit, a heating element traversable by the liquid heat conductor located in a second branch of said liquid conductor circuit and valve means in said liquid conductor circuit between said first and second branches, said valve means (1) causing liquid heat conductor to flow from said heater to said heating element in a first position, (2) blocking flow of said liquid heat conductor from said first branch to said second branch while directing said flow to said heat exchanger in a second position, and (3) interconnecting said cooling circuit and said second branch while blocking flow from said first branch in a third position, and wherein a bunk and a partition are positioned in said compartment in a manner creating a flow path for air heated by said heating element over said partition, around said bunk and back to said heating element.

2. Motor vehicle according to claim 1, characterized by the fact that said heating element is disposed in a duct, said duct having a fresh air intake at a bottom and a hot air outlet at a top thereof.

3. Motor vehicle according to claim 2, characterized by the fact that the heating element is a plate heater.

4. Motor vehicle according to claims 2 or 3, characterized by the fact that the duct is delimited by one outside wall of the passenger compartment and said partition which is parallel thereto.

5. Motor vehicle according to claim 1 or 2 or 3, wherein said passenger compartment is a driver's cab having a sleeping compartment with said bunk, the heating element and partition being disposed in said sleeping compartment parallel to a rear wall of the driver's cab.

6. A motor vehicle according to claim 5, wherein said heat exchanger is located at the front of said driver's cab and said heating element is at the rear of said sleeping compartment.

7. Motor vehicle according to claim 1 or 5, comprising a hot air blower for forced circulation in contact with said heating element, said blower having a lower power and a lower rpm than the hot air blower operable in association with said heat exchanger.

8. Motor vehicle according to claim 1, wherein said heating element is provided with a heat storage capacity for enabling heating of said compartment for a period of time after engine shut-off without operation of said engine independent heater.

* * * * *